United States Patent
Pularikkal et al.

(10) Patent No.: US 11,411,958 B2
(45) Date of Patent: Aug. 9, 2022

(54) MACHINE LEARNING-BASED APPLICATION POSTURE FOR ZERO TRUST NETWORKING

(71) Applicant: Cisco Technology, Inc., San Jose, CA (US)

(72) Inventors: Gangadharan Byju Pularikkal, San Jose, CA (US); Santosh Ramrao Patil, Santa Clara, CA (US); Bart Brinckman, Nevele (BE); Madhusudan Nanjanagud, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 428 days.

(21) Appl. No.: 16/251,654

(22) Filed: Jan. 18, 2019

(65) Prior Publication Data

US 2020/0236112 A1  Jul. 23, 2020

(51) Int. Cl.
*H04L 9/40* (2022.01)
*H04L 43/062* (2022.01)
*G06N 20/00* (2019.01)

(52) U.S. Cl.
CPC .......... *H04L 63/102* (2013.01); *G06N 20/00* (2019.01); *H04L 43/062* (2013.01); *H04L 63/104* (2013.01); *H04L 63/1425* (2013.01); *H04L 63/20* (2013.01)

(58) Field of Classification Search
CPC ... H04L 63/102; H04L 43/062; H04L 63/104; H04L 63/1425; H04L 63/20; G06N 20/00
See application file for complete search history.

(56) References Cited

U.S. PATENT DOCUMENTS

| | | | |
|---|---|---|---|
| 8,555,348 B2 | 10/2013 | Khosravi et al. | |
| 9,756,061 B1* | 9/2017 | Roeh | H04L 63/1425 |
| 10,116,679 B1* | 10/2018 | Wu | H04W 12/121 |
| 2015/0242605 A1 | 8/2015 | Du et al. | |
| 2017/0251013 A1 | 8/2017 | Kirti et al. | |

(Continued)

OTHER PUBLICATIONS

Nather, Wendy., "Moving Beyond the Perimeter", The Theory Behind Google's BeyondCorp Security Model, Part One, 9 pages, 2017, Duo.

(Continued)

*Primary Examiner* — Oleg Korsak
(74) *Attorney, Agent, or Firm* — Behmke Innovation Group LLP; Kenneth J. Heywood; Jonathon P. Western (57) ABSTRACT

In one embodiment, a gateway to a zero trust network applies an access control policy to an endpoint device attempting to access a cloud-based application hosted by the zero trust network. The gateway acts as a reverse proxy between the endpoint device and the cloud-based application, based on the access control policy applied to the endpoint device. The gateway captures telemetry data regarding application traffic reverse proxied by the gateway between the endpoint device and the cloud-based application. The gateway detects an anomalous behavior of the application traffic by comparing the captured telemetry data to a machine learning-based behavioral model for the application. The gateway initiates a mitigation action for the detected anomalous behavior of the application traffic.

15 Claims, 9 Drawing Sheets

(56) References Cited

U.S. PATENT DOCUMENTS

| | | | | |
|---|---|---|---|---|
| 2019/0052659 | A1* | 2/2019 | Weingarten | H04L 41/0893 |
| 2019/0141015 | A1* | 5/2019 | Nellen | H04L 61/1511 |
| 2019/0312860 | A1* | 10/2019 | Dykes | H04L 63/10 |
| 2020/0137093 | A1* | 4/2020 | Janakiraman | H04L 61/1511 |
| 2020/0137094 | A1* | 4/2020 | Janakiraman | H04L 67/22 |
| 2020/0137115 | A1* | 4/2020 | Janakiraman | H04L 12/4633 |
| 2020/0236131 | A1* | 7/2020 | Vejman | G06N 3/0445 |
| 2020/0336484 | A1* | 10/2020 | Mahajan | H04L 67/28 |
| 2021/0026654 | A1* | 1/2021 | Soman | G06F 9/44505 |
| 2021/0112034 | A1* | 4/2021 | Sundararajan | H04L 12/4633 |

OTHER PUBLICATIONS

Ward, et al., "BeyondCorp: A New Approach to Enterprise Security", login, vol. 39, No. 6, pp. 6-11, Dec. 2014., usenix.org.

"Moving Beyond the Perimeter: Part 2", https://duo.com/resources/ebooks/moving-beyond-the-perimeter-part-2, 4 pages, Accessed on Nov. 14, 2018., Duo.

"What is a Zero Trust Architecture?" Palo Alto Network; pp. 1-3; 2018.

https://en.wikipedia.org/wiki/Reverse_proxy; Reverse proxy—Wikipedia; pp. 1-2.

* cited by examiner

MACHINE LEARNING-BASED APPLICATION POSTURE FOR ZERO TRUST NETWORKING

TECHNICAL FIELD

The present disclosure relates generally to computer networks, and, more particularly, to machine learning based-application posture for zero trust networking.

BACKGROUND

As applications continue to move to the cloud, security is increasingly becoming a concern, with endpoint devices accessing a cloud-based application from potentially anywhere in the world. Indeed, applications hosted in the cloud are particularly susceptible to data exfiltration whereby a malicious entity gains access to otherwise protected data for purposes of identity theft, fraud, or the like.

Zero trust networking is a relatively new paradigm that seeks to address some of the security concerns associated with cloud-based applications. In general, zero trust networking operates under the principle that all networks are untrusted, including both private enterprise networks and external public networks. Thus, even if a malicious entity were to gain access to an endpoint device in a private enterprise network, the malicious entity may be prevented from making lateral movements in the network (e.g., from the infected device to a server), thanks to the segmentation of network resources by application of zero trust networking principles to the network. However, while zero trust networking is effective in many scenarios, it also takes a relatively limited approach to allowing access to a network resource. Notably, once an endpoint device has been granted access to a resource, such as an application, the posture of the application is currently ignored under zero trust networking.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a gateway to a zero trust network applies an access control policy to an endpoint device attempting to access a cloud-based application hosted by the zero trust network. The gateway acts as a reverse proxy between the endpoint device and the cloud-based application, based on the access control policy applied to the endpoint device. The gateway captures telemetry data regarding application traffic reverse proxied by the gateway between the endpoint device and the cloud-based application. The gateway detects an anomalous behavior of the application traffic by comparing the captured telemetry data to a machine learning-based behavioral model for the application. The gateway initiates a mitigation action for the detected anomalous behavior of the application traffic.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
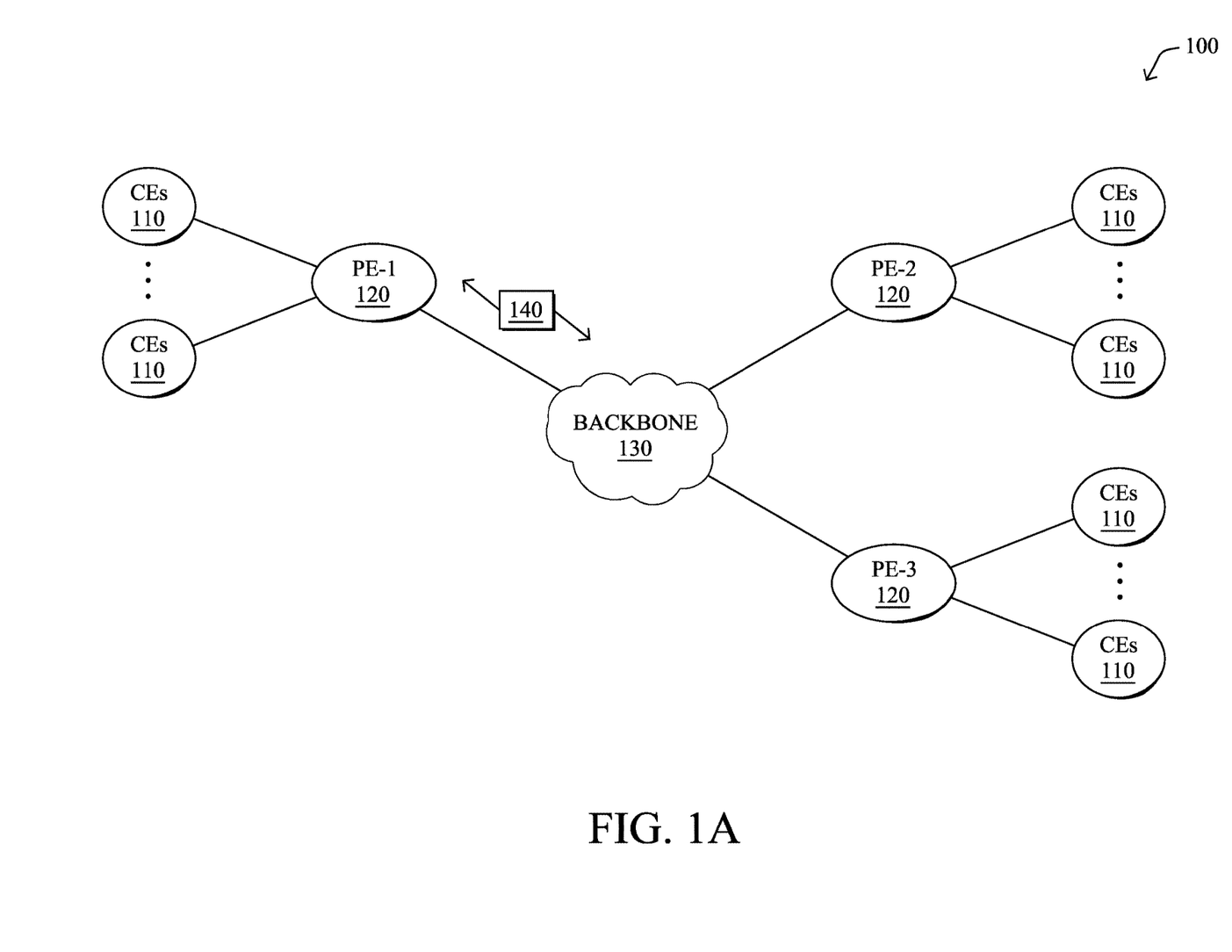
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection. 2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
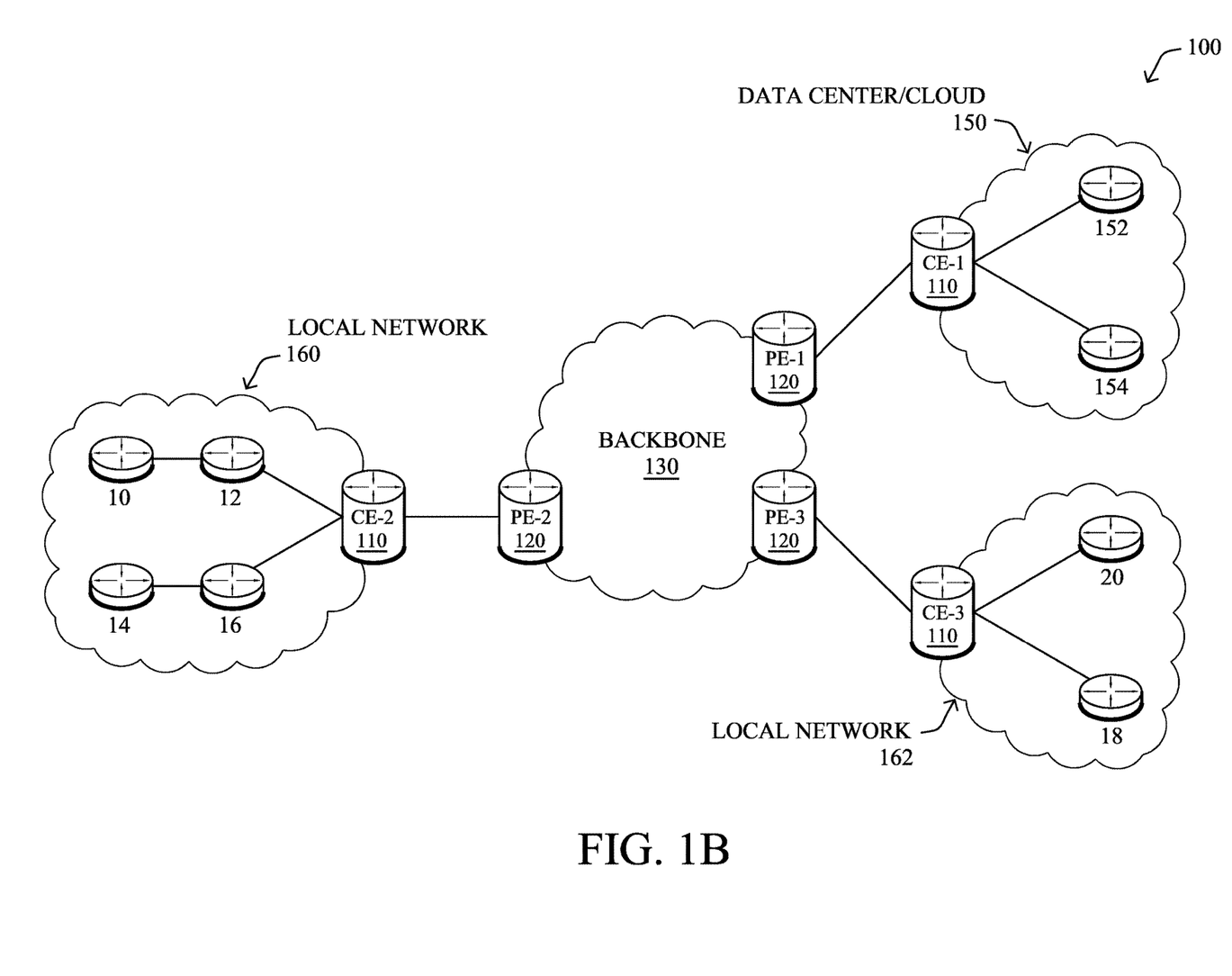

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
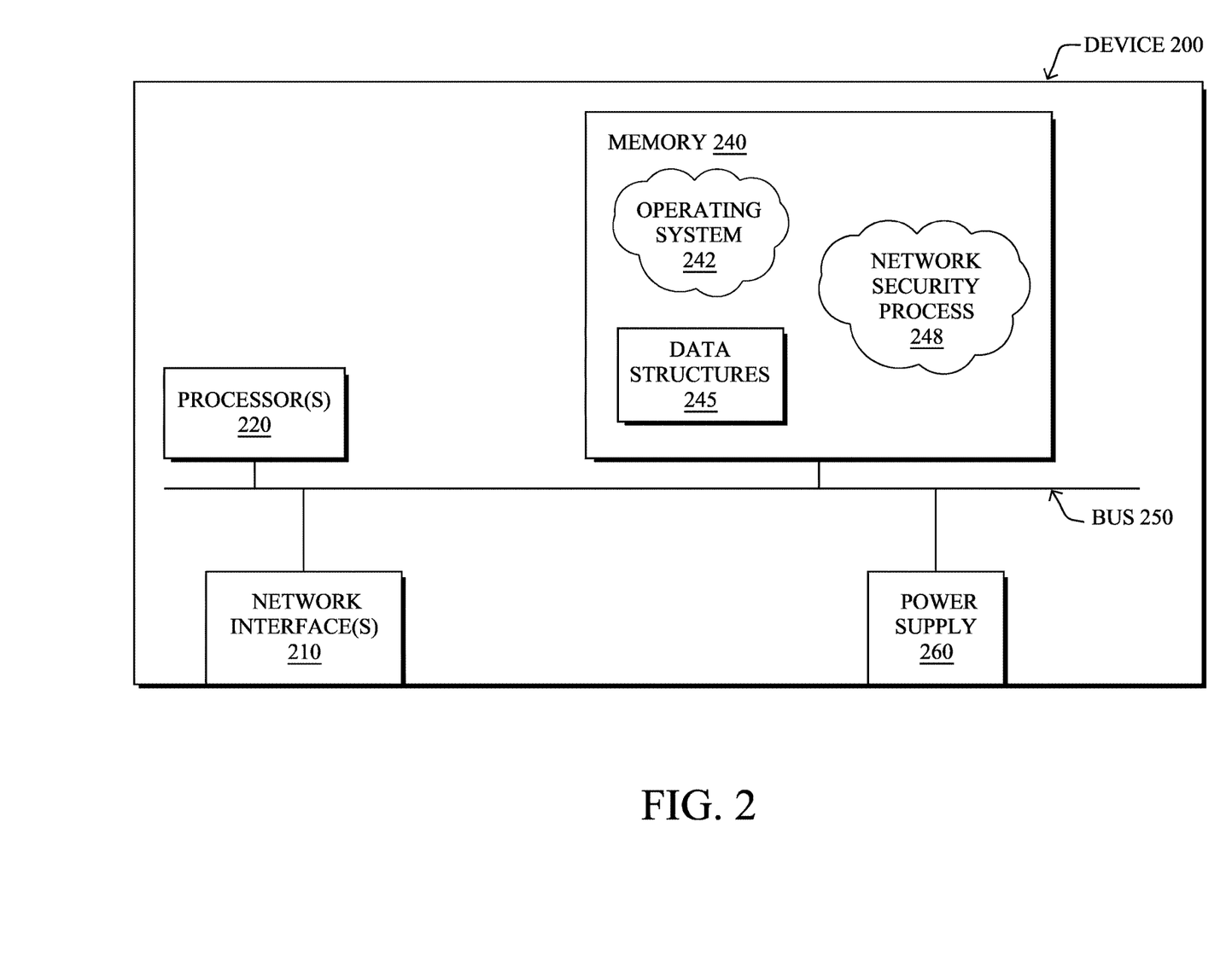
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network security process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, network security process 248 may execute one or more machine learning-based classifiers to assess traffic in the network and determine the posture of the source application of the traffic. In turn, network security process 248 may apply any number of network security policies to the traffic, based on the posture of the underlying application.

Network security process 248 may employ any number of machine learning techniques, to classify gathered traffic telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, security process 248 can use the model M to classify new data points, such as information regarding new traffic flows in the network. Often, M is a statistical model, and the cost function is inversely proportional to the likelihood of M, given the input data.

In various embodiments, network security process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal application behavior," or "anomalous application behavior." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic and/or underlying application. Semi-supervised learning models take a middle ground approach that uses a greatly reduced set of labeled training data.

Example machine learning techniques that network security process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as indicative of anomalous application behavior. Conversely, the false negatives of the model may refer to the number of traffic flows that the model incorrectly classifies as being indicative of normal application behavior. True negatives and positives may refer to the number of traffic flows that the model correctly classifies as indicative of normal or abnormal application behavior, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, network security process 248 may assess the captured telemetry data on a per-flow basis. In other embodiments, network security process 248 may assess telemetry data for a plurality of traffic flows based on any number of different conditions. For example, traffic flows may be grouped for analysis based on their sources, destinations, temporal characteristics (e.g., flows that occur around the same time, etc.), combinations thereof, or based on any other set of flow characteristics.

As noted above, zero trust networking operates under the principle that all networks are untrusted. Typical zero trust networking solutions, such as BeyondCorp and DUO Beyond, base access policy decisions on the concepts of trusted users and trusted devices. Under such models, if the user provides credentials for a trusted user profile, and the user is also operating an endpoint device that is trusted (e.g., based on make, model, location, etc.), the user will be allowed access to the requested application. However, this approach has the following drawbacks:

- User and device trust are verified only when the end user first tries to connect to an application server. After a session is established, there is no further check done by the zero trust networking architecture.
- Current zero trust networking architectures also do not take into account the posture of the application being used. In other words, once the user is allowed access to the application, the interactions between the end user and the application are completely ignored under current zero trust networking architectures.

Machine Learning-Based Application Posture for Zero Trust Networking

The techniques herein introduce a machine learning-based mechanism to incorporate application posture verification into zero trust networking architectures. In some aspects, supervised learning can be leveraged to perform application posture analysis during the entire lifecycle of an application session. Incorporating the application posture into a zero trust networking architecture can significantly improve the overall security of the network, as well as provide granular access control mediation actions, in the event that a behavioral anomaly is detected.

Specifically, according to one or more embodiments of the disclosure as described in detail below, a gateway to a zero trust network applies an access control policy to an endpoint device attempting to access a cloud-based application hosted by the zero trust network. The gateway acts as a reverse proxy between the endpoint device and the cloud-based application, based on the access control policy applied to the endpoint device. The gateway captures telemetry data regarding application traffic reverse proxied by the gateway between the endpoint device and the cloud-based application. The gateway detects an anomalous behavior of the application traffic by comparing the captured telemetry data to a machine learning-based behavioral model for the application. The gateway initiates a mitigation action for the detected anomalous behavior of the application traffic.

Illustratively, the techniques described herein may be performed by hardware, software, and/or firmware, such as in accordance with the network security process 248, which may include computer executable instructions executed by the processor 220 (or independent processor of interfaces 210) to perform functions relating to the techniques described herein.

Figure 3A:
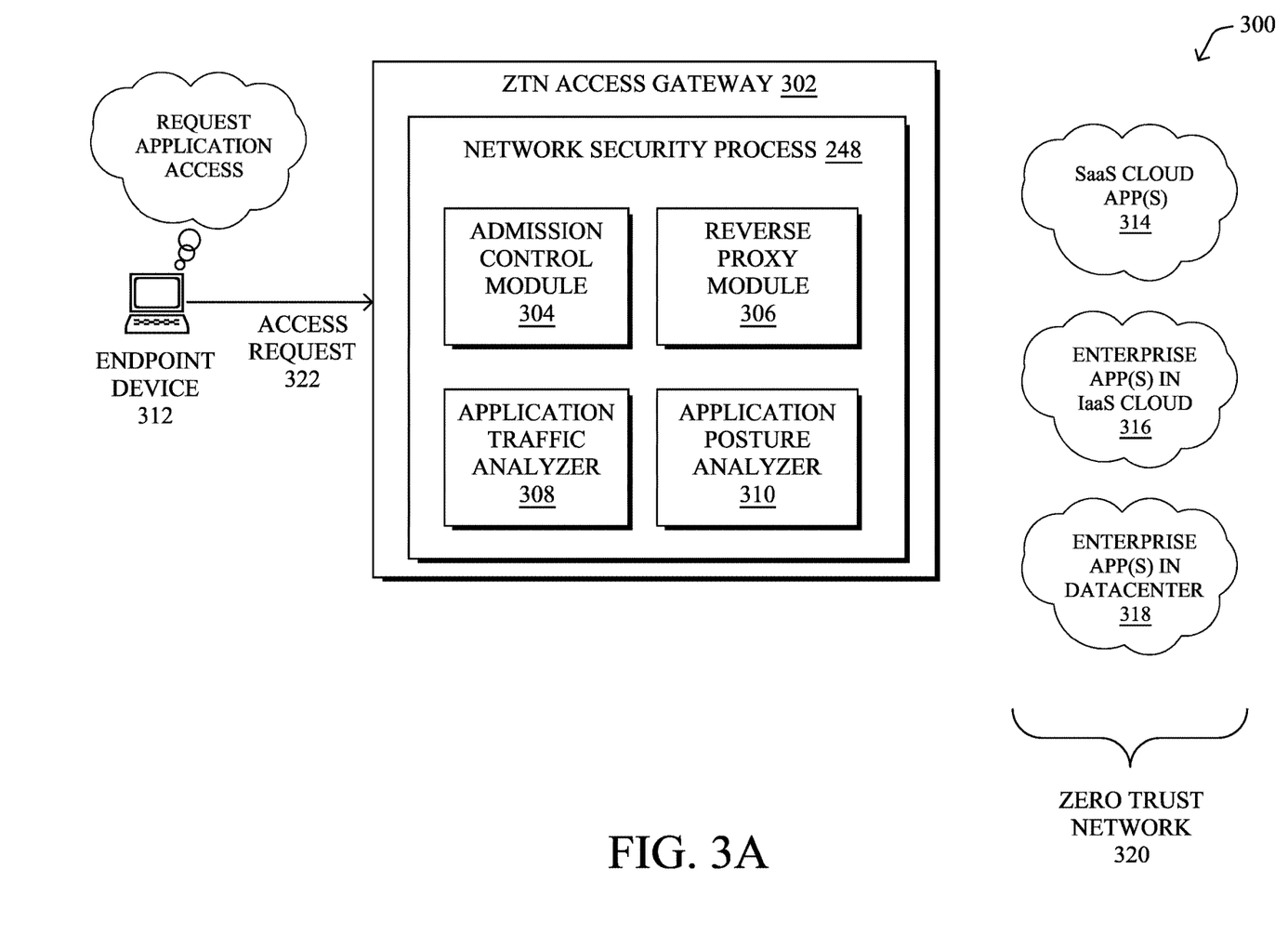
FIGS. 3A-3E illustrate an example zero trust network architecture.

Operationally, FIGS. 3A-3E illustrate an example zero trust network architecture 300, according to various embodiments. As shown in FIG. 3A, at the core of architecture 300 is a zero trust network (ZTN) gateway 302 (e.g., a device 200) that executes network security process 248, to provide controlled access to the resources in zero trust network 320. In general, network security process 248 may comprise any or all of the following components: an admission control module 304, a reverse proxy module 306, an application traffic analyzer 308, and/or an application posture analyzer 310. As would be appreciated, these components 304-310 may be implemented in a distributed manner or implemented as their own stand-alone services, either as a local or remote service that operates in conjunction with ZTN access gateway 302. In addition, the functionalities of components 304-310 may be combined, omitted, or implemented as part of other processes, as desired.

Hosted within zero trust network 320 may be any number of cloud-based applications, such as software as a service (SaaS) cloud application(s) 314, enterprise application(s) 316 in an infrastructure as a service (IaaS) cloud, and/or enterprise application(s) 318 hosted in a datacenter. All access requests for applications 314-318 may be steered through ZTN access gateway 302, such as by pointing the DNS CNAME records for applications 314-318 towards the IP address of ZTN access gateway 302. For example, assume that an endpoint device 312 located within any network, be it a public or private network, requests access to one of SaaS cloud applications 314 via an access request 322. In such a case, the request may be directed towards ZTN access gateway 302.

Figure 3B:
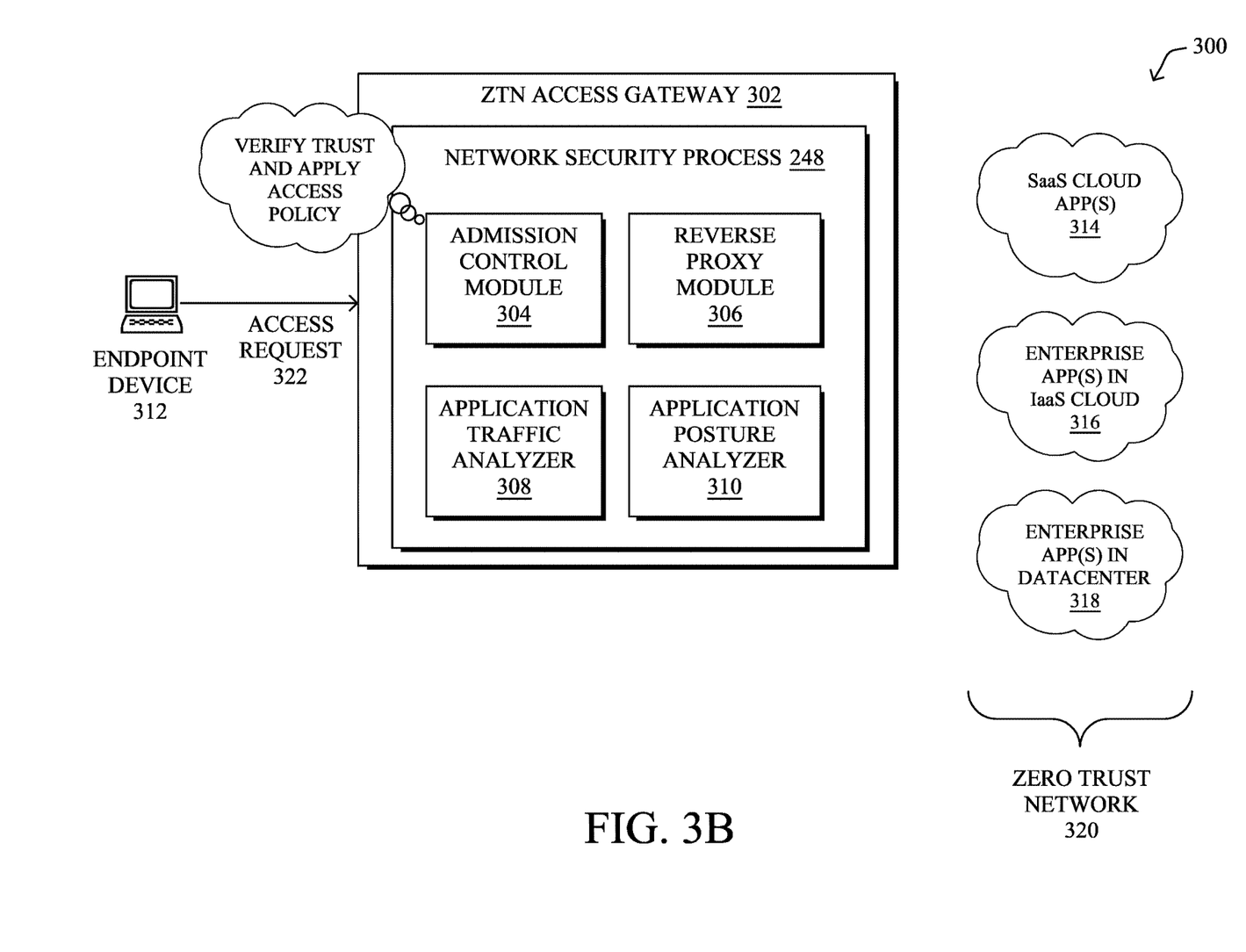

As shown in FIG. 3B, after ZTN access gateway 302 receives access request 322 from endpoint device 312, admission control module 304 may first determine whether to allow endpoint device 312 to access the requested application 314. To do so, admission control module 304 may perform any or all of the following:

- Verify User Trust—In general, this step entails admission control module 304 determining whether the user of endpoint device 312 is authorized to access the requested application 314. For example, access request 304 may include information regarding the user profile of the user of endpoint device 312. In another example, assume that endpoint device 312 participates in a single sign on (SSO) mechanism with an enterprise or cloud-based Identity Management System (IDM). In such a case, admission control module 304 may operate in conjunction with the IDM, to authenticate the user and the level of trust associated with the user's profile.
- Verify Device Trust—In addition to verify the user trust, admission control module 304 may also determine the trust of endpoint device 312 attempting to access one of applications 314. For example, admission control module 304 may compare device information regarding endpoint device 312 (e.g., as included in request 322) to an inventory of devices and/or device postures, to determine whether endpoint device 312 is trusted. For example, admission control module 304 may evaluate the location of endpoint device 312, the make/model/software configuration of endpoint device 312, and/or other device information, to determine whether endpoint device 312 is trusted to access the requested application 314.
- Apply Access Control Policy/Policies: Once admission control module 304 has verified the trust of endpoint device 312 and the user profile of the user of endpoint device 312, admission control module 304 may apply any number of group-based access control policies to the application session. Such access control polices could vary based up on the location of endpoint device 312, device trust level, etc. Of course, if endpoint device 312 and/or the user of endpoint device 312 is untrusted, admission control module 304 may block endpoint device 312 from accessing the requested application 314.

Figure 3C:
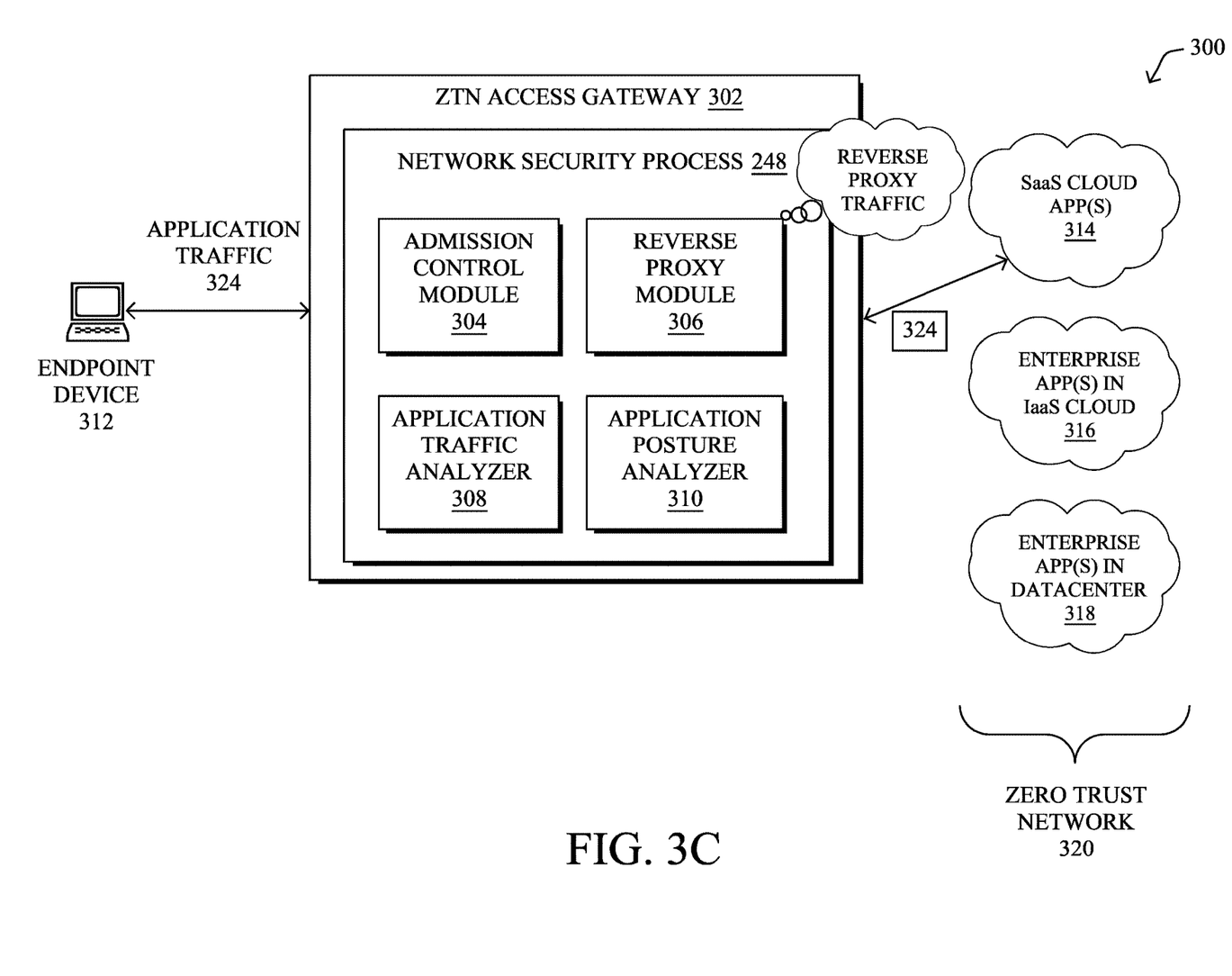

As shown in FIG. 3C, if admission control module 304 determines that endpoint device 312 is trusted to access the application requested by access request 322, reverse proxy module 306 may operate as a reverse proxy on behalf of the requested application 314. In general, reverse proxying entails an intermediary, such as ZTN access gateway 302, accessing a resource (e.g., the requested application 314) on behalf of endpoint device 312 and returning data to endpoint device 312 on behalf of application 314. In other words, reverse proxy module 306 may act as a "reverse" proxy in that endpoint device 312 may interact with ZTN access gateway 302 under the belief that it is actually interacting directly with application 314. While acting as a reverse proxy between cloud application 314 and endpoint device 312, reverse proxy module 306 may then relay application traffic 324 between the two.

While the admission control functions of admission control module 304, coupled with the reverse proxy functions of reverse proxy module 306, are often enough to prevent most security breaches from occurring, there is still the possibility under current ZTN paradigms for data exfiltration to occur after granting an endpoint access to an application. Accordingly, the techniques herein also introduce a closed loop monitoring mechanism for the application session, as well as a mechanism that assesses the posture of the application throughout the lifecycle of the application session.

Figure 3D:
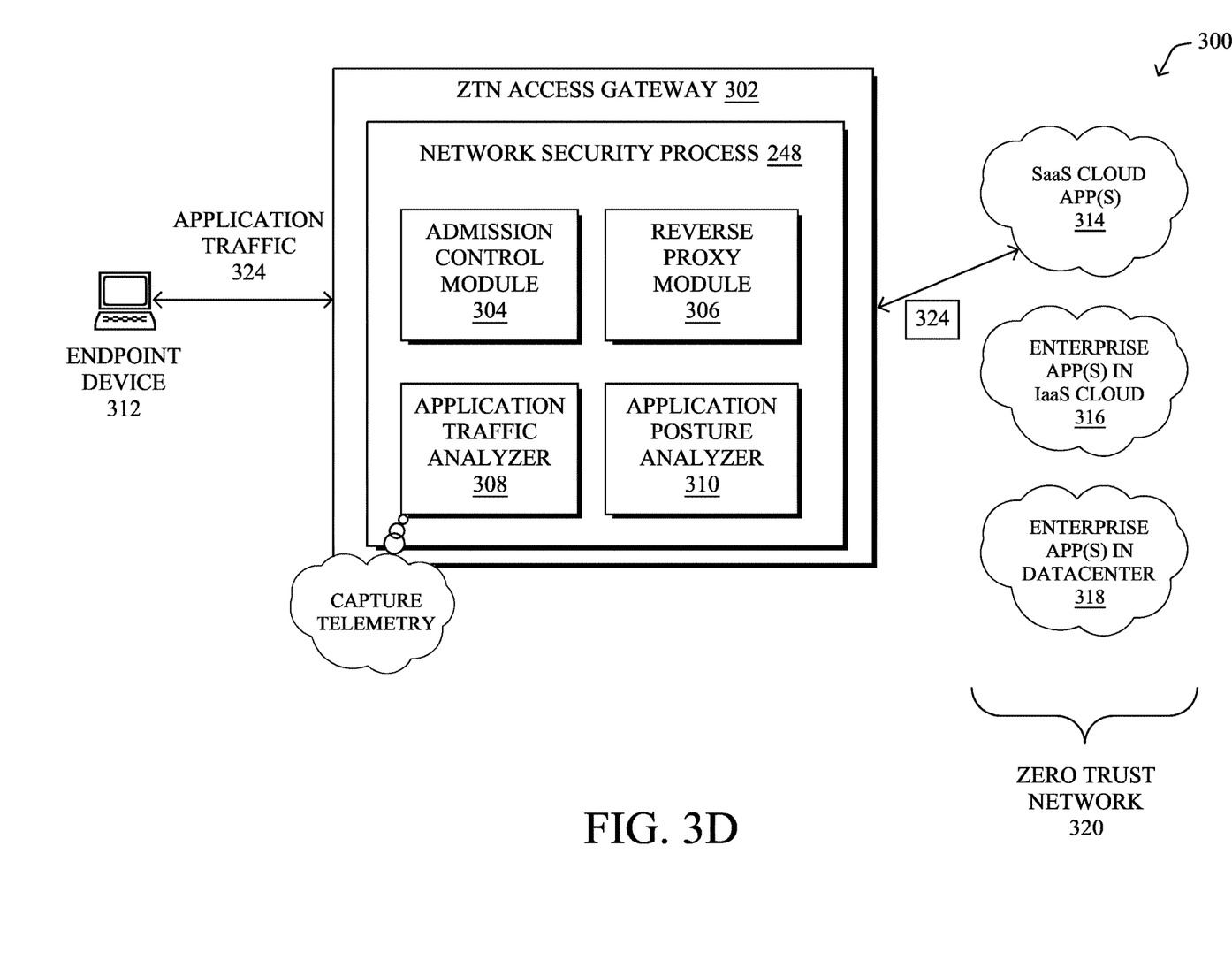

As shown in FIG. 3D, while an application session is active between endpoint device 312 and a cloud-based application, such as cloud application 314, application traffic analyzer 308 may capture telemetry regarding application traffic 324. In other words, while application traffic 324 is send through ZTN access gateway 302 during its operations as a reverse proxy on behalf of cloud application 314, application traffic analyzer 308 may also capture telemetry data regarding application traffic 324.

Example telemetry information that application traffic analyzer 308 may capture regarding application traffic 324 may include, but is not limited to, any or all of the following:
  Packet size information—e.g., maximum, minimum, average packet size, etc.
  Packet count information—e.g., maximum, minimum, average packet count, etc.
  Packet timing information—e.g., maximum, minimum, average flow duration, etc.
  Packet header information
  Packet payload information—e.g., which functions endpoint device 312 seeks to perform within application 314 and/or the data that endpoint device 312 seeks to access within application 314.

Figure 3E:
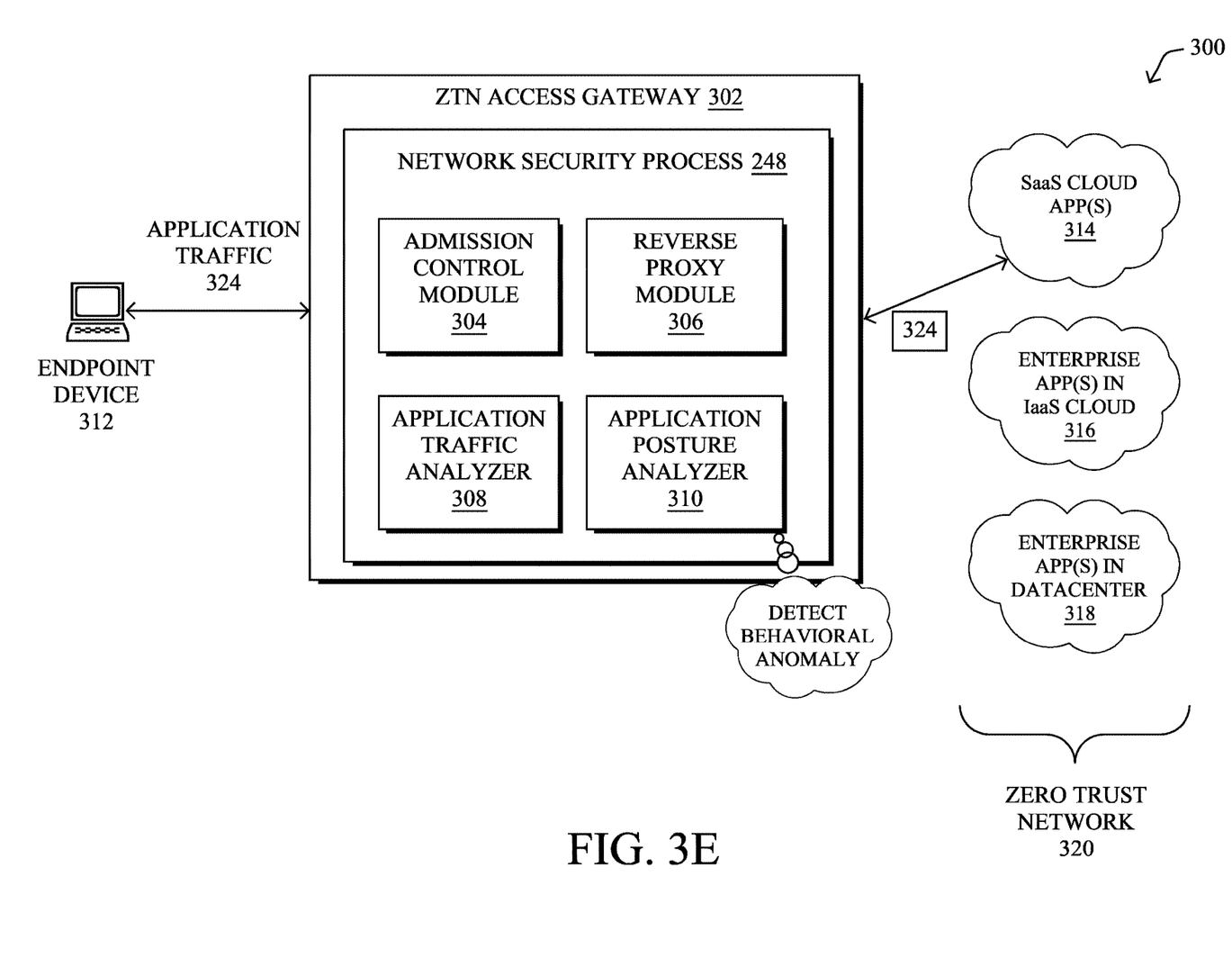

As shown in FIG. 3E, application posture analyzer 310 may then assess the telemetry data captured by application traffic analyzer 308, to determine whether the behavior of application traffic 324 is anomalous, according to various embodiments. In other words, application posture analyzer 310 may continuously assess the posture of the application during an application session with one of applications 314-318. If application posture analyzer 310 detects such a behavioral anomaly, it may then initiate a mitigation action, such as ending the application session/blocking application traffic 324, sending an alert to a user interface operated by a security expert, limiting access privileges during the session or demoting endpoint device 312 to a more restrictive access policy, combinations thereof, or the like.

Note that for the same application, the expected application posture can vary on a per user group basis, such as according to a group-based policy applied by admission control module 304. Thus, in some embodiments, application posture analyzer 310 may also take as input the admission/access policy applied to endpoint device 312 by admission control module 304 and/or the factors used by module 304 to assign such a policy to device 312 (e.g., user profile, device information, etc.). Indeed, even for the same user, the expected application posture can be different depending up on the user location, device trust level, etc.

In some embodiments, application posture analyzer 310 may include a machine learning-based behavioral model, to detect behavioral anomalies. For example, such a model may model 'normal' vs. 'abnormal' application behaviors and application posture analyzer 310 can compare its input date (e.g., the captured telemetry data regarding application traffic 324, policy information from module 304, etc.) to the model, to determine whether the behavior of the session is normal or abnormal. In one embodiment, such a behavioral model may take the form of one or more supervised learning-based classifiers that apply a label to the input data to application posture analyzer 310 (e.g., 'normal' or 'abnormal'). In another embodiment, such a behavioral model may be learned over time using unsupervised learning.

Training of the one or more machine learning classifiers of application posture analyzer 310 can be achieved either in an online or offline manner. For example, offline training can be achieved by obtaining labeled training data from the various stakeholders involved, such as the following:
  Cloud-based application providers: Application providers who are part of the solution ecosystem will be in a position to provide lab generated reference data which closely resembles the production traces. In addition, application providers could provide sanitized versions of production application data which will remove personally identifiable information (e.g., the identity of an end user, etc.). In the latter case, the confidentiality will not be an issue since applications typically use encryption technologies, such as transport layer security (TLS).
  Enterprise IT & InfoSec: If the posture analysis needs to be customized to the expected application behavior per user group of an enterprise, the training data may be provided or labeled by that enterprise.

As indicated earlier, supervised machine learning models can be used for the application posture analysis of application posture analyzer 310. Typically, the objective of such a model is NOT to classify a single application traffic flow, but instead to detect behavioral anomalies in the application stream between the endpoint device 312 and the application (e.g., application 314), based on the expected application posture. For example, a random forest-based classifier may be trained using labeled data to identify outlier behaviors in the interactions between the endpoint device and the application.

For illustrative purposes, the following examples are provided of potential behavioral anomalies that application posture analyzer 310 may detect:
  A specific application is expected to have a maximum burst of N kbps per flow and average rate of N. Anything that exceeds these limits could indicate an anomaly.
  A user belongs to a group-based policy for an application which only has read only access to the files and no permissions available to edit. If the user edits the files, that can indicate compromised access and, thus, a behavioral anomaly.
  For the same enterprise application, a user may have different access privileges depending up on the following: a.) whether the endpoint device is trusted or untrusted and b.) whether the user is located on an enterprise premise or is roaming.

Figure 4:
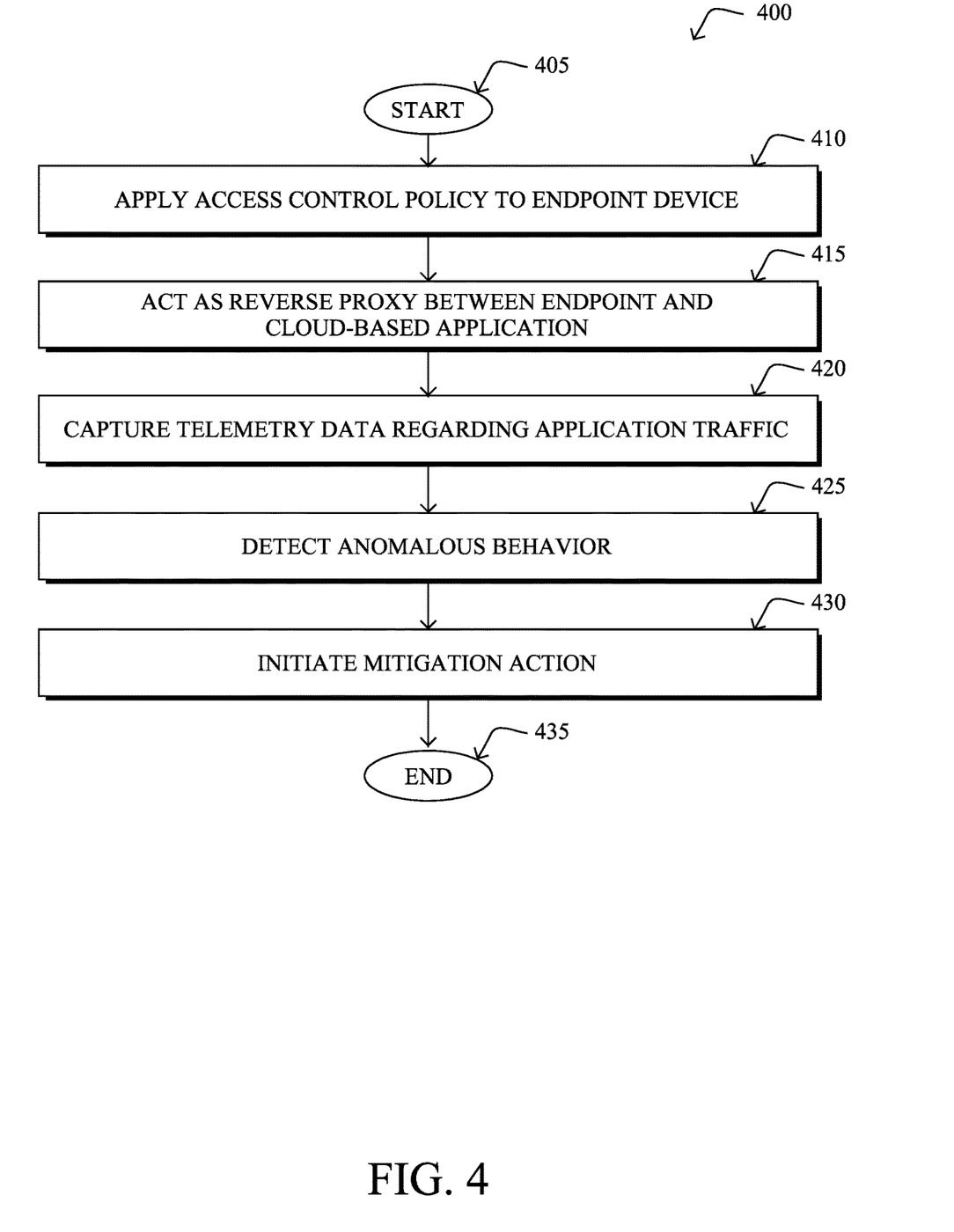
FIG. 4 illustrates an example simplified procedure for detecting anomalous behavior in a zero trust network.

FIG. 4 illustrates an example simplified procedure for detecting anomalous behavior in a zero trust network, in accordance with one or more embodiments described herein. For example, a non-generic, specifically configured device (e.g., device 200), such as a ZTN access gateway, may perform procedure 400 by executing stored instructions (e.g., process 248). The procedure 400 may start at step 405, and continues to step 410, where, as described in greater detail above, the gateway applies an access control policy to an endpoint device attempting to access a cloud-based application hosted by the zero trust network. Such a policy may be based on any or all of the following: a user profile of the user operating the endpoint device, the profile/posture of the endpoint device itself (e.g., location, make, model, type, etc.), and/or the application for which the endpoint device seeks access.

At step 415, as detailed above, the gateway may act as a reverse proxy between the endpoint device and the cloud-based application, based on the access control policy applied to the endpoint device. For example, if the endpoint device is authorized to access the application, it may interact with the gateway instead of the application itself, with the gateway serving as a proxy on behalf of the application.

At step 420, the gateway may capture telemetry data regarding application traffic reverse proxied by the gateway between the endpoint device and the cloud-based application, as described in greater detail above. Notably, as the gateway is acting as a reverse proxy on behalf of the application, the gateway is also uniquely positioned to capture telemetry data regarding the interactions between the endpoint device and the application. In various embodiments, the telemetry data may be indicative of the packet size of the traffic, the packet timing of the traffic, flow data rate, or even the transactions that the endpoint device seeks to perform within the application (e.g., reading certain data, writing certain data, or editing certain data).

At step 425, as detailed above, the gateway may detect an anomalous behavior of the application traffic by comparing the captured telemetry data to a machine learning-based behavioral model for the application. In general, such a model may model the 'normal' posture of the application. In some embodiments, the model may take the form of a supervised learning classifier that is trained to distinguish between 'normal' and 'anomalous' behaviors. In further embodiments, the model may also take as input the user profile information (e.g., the group to which the user belongs), so as to also model different behaviors for different groups of users of the application.

At step 430, the gateway may initiate a mitigation action for the detected anomalous behavior of the application traffic, as described in greater detail above. For example, the mitigation action may entail blocking the application traffic/ ending the application session, sending an alert to a user interface regarding the detected anomalous behavior, or lowering the permission level of the endpoint device within the application. Procedure 400 then ends at step 435.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a closed loop mechanism for use in zero trust networks that also takes into account the application posture of the application. Indeed, rather than simply allowing or blocking access to the application, the techniques herein also provide for the continual monitoring of how the endpoint device/user interacts with the application. If the behavior becomes anomalous during the application session, mitigation actions can then be initiated.

While there have been shown and described illustrative embodiments that provide for using machine learning to assess application posture in a zero trust network, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

applying, by a gateway to a zero trust network, an access control policy to an endpoint device attempting to access a cloud-based application hosted by the zero trust network;

in response to the access control policy indicating that the endpoint device is allowed to access the cloud-based application:

acting, by the gateway, as a reverse proxy between the endpoint device and the cloud-based application, capturing, by the gateway, telemetry data regarding application traffic reverse proxied by the gateway between the endpoint device and the cloud-based application, detecting, by the gateway, an anomalous behavior of the application traffic by using the captured telemetry data and user profile information associated with the endpoint device as input to a supervised learning-based classifier that is trained to distinguish between normal and anomalous behaviors of the application, and initiating, by the gateway, a mitigation action for the detected anomalous behavior of the application traffic; and in response to the access control policy indicating that the endpoint device is not allowed to access the cloud-based application, blocking, by the gateway, the endpoint device from accessing the cloud-based application.

2. The method as in claim 1, wherein the mitigation action comprises blocking the application traffic or sending an alert to a user interface regarding the detected anomalous behavior.

3. The method as in claim 1, wherein the gateway applies the access control policy to the endpoint device based on a user profile associated with the endpoint device, a device profile of the endpoint device, and the cloud-based application.

4. The method as in claim 1, wherein the telemetry data is indicative of a flow data rate of the application traffic.

5. The method as in claim 1, further comprising:
obtaining a training dataset that includes application traffic between the cloud-based application and a plurality of endpoint devices; and
using the training dataset to train the machine learning-based behavioral model for the application.

6. An apparatus, comprising:
one or more network interfaces to communicate with a zero trust network;
a processor coupled to the network interfaces and configured to execute one or more processes; and
a memory configured to store a process executable by the processor, the process when executed configured to:
apply an access control policy to an endpoint device attempting to access a cloud-based application hosted by the zero trust network;
in response to the access control policy indicating that the endpoint device is allowed to access the cloud-based application:
act as a reverse proxy between the endpoint device and the cloud-based application,
capture telemetry data regarding application traffic reverse proxied by the gateway between the endpoint device and the cloud-based application,
detect an anomalous behavior of the application traffic by using the captured telemetry data and user profile information associated with the endpoint device as input to a supervised learning-based classifier that is trained to distinguish between normal and anomalous behaviors of the application, and
initiate a mitigation action for the detected anomalous behavior of the application traffic; and
in response to the access control policy indicating that the endpoint device is not allowed to access the cloud-based application, block the endpoint device from accessing the cloud-based application.

7. The apparatus as in claim 6, wherein the mitigation action comprises blocking the application traffic or sending an alert to a user interface regarding the detected anomalous behavior.

8. The apparatus as in claim 6, wherein the gateway applies the access control policy to the endpoint device based on a user profile associated with the endpoint device, a device profile of the endpoint device, and the cloud-based application.

9. The apparatus as in claim 6, wherein the telemetry data is indicative of a flow data rate of the application traffic.

10. The apparatus as in claim 6, wherein the process when executed is further configured to:
obtain a training dataset that includes application traffic between the cloud-based application and a plurality of endpoint devices; and
use the training dataset to train the machine learning-based behavioral model for the application.

11. A tangible, non-transitory, computer-readable medium storing program instructions that cause a gateway to a zero trust network to execute a process comprising:
applying, by the gateway to the zero trust network, an access control policy to an endpoint device attempting to access a cloud-based application hosted by the zero trust network;
in response to the access control policy indicating that the endpoint device is allowed to access the cloud-based application:
acting, by the gateway, as a reverse proxy between the endpoint device and the cloud-based application,
capturing, by the gateway, telemetry data regarding application traffic reverse proxied by the gateway between the endpoint device and the cloud-based application,
detecting, by the gateway, an anomalous behavior of the application traffic by using the captured telemetry data and user profile information associated with the endpoint device as input to a supervised learning-based classifier that is trained to distinguish between normal and anomalous behaviors of the application, and
initiating, by the gateway, a mitigation action for the detected anomalous behavior of the application traffic; and
in response to the access control policy indicating that the endpoint device is not allowed to access the cloud-based application, blocking, by the gateway, the endpoint device from accessing the cloud-based application.

12. The computer-readable medium as in claim 11, wherein the mitigation action comprises blocking the application traffic or sending an alert to a user interface regarding the detected anomalous behavior.

13. The computer-readable medium as in claim 11, wherein the gateway applies the access control policy to the endpoint device based on a user profile associated with the endpoint device, a device profile of the endpoint device, and the cloud-based application.

14. The computer-readable medium as in claim 11, wherein the telemetry data is indicative of a flow data rate of the application traffic.

15. The computer-readable medium as in claim 11, wherein the process further comprises:
obtaining a training dataset that includes application traffic between the cloud-based application and a plurality of endpoint devices; and
using the training dataset to train the machine learning-based behavioral model for the application.

\* \* \* \* \*